US009023175B2

(12) United States Patent  (10) Patent No.: US 9,023,175 B2
Hecht  (45) Date of Patent: May 5, 2015

(54) CARBON/CARBON FILM ADHESIVE

(75) Inventor: Daniel H. Hecht, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 299 days.

(21) Appl. No.: 12/185,653

(22) Filed: Aug. 4, 2008

(65) Prior Publication Data

US 2010/0024975 A1  Feb. 4, 2010

(51) Int. Cl.
*B05D 5/10*  (2006.01)
*B32B 37/00*  (2006.01)
*B32B 5/16*  (2006.01)
*C09J 7/04*  (2006.01)
*C08K 3/04*  (2006.01)
*C08K 7/06*  (2006.01)

(52) U.S. Cl.
CPC ... *C09J 7/04* (2013.01); *C08K 3/04* (2013.01); *C09J 2205/106* (2013.01); *C09J 2400/263* (2013.01); *C09J 2400/283* (2013.01); *C09J 2461/00* (2013.01); *C08K 7/06* (2013.01); *C09J 2205/102* (2013.01); *Y10S 977/742* (2013.01)

(58) Field of Classification Search
CPC ....... C08K 3/04; C08K 7/06; C09J 2205/102; C09J 2205/106; C09J 2400/263; B29C 70/025; B29C 70/44; B29C 70/48; B29C 70/543; B29C 70/167; C04B 35/83
USPC ...................................................... 156/307.1
See application file for complete search history.

(56) References Cited

U.S. PATENT DOCUMENTS

| 4,695,508 | A | 9/1987 | Kageyama |
| 4,983,451 | A * | 1/1991 | Sugino et al. ................. 442/388 |
| 5,002,981 | A | 3/1991 | Chiu |
| 5,280,063 | A | 1/1994 | Lewis et al. |
| 5,292,460 | A * | 3/1994 | Kyutoku et al. ............. 264/29.5 |
| 6,341,747 | B1 | 1/2002 | Schmidt et al. |
| 6,958,370 | B1 * | 10/2005 | Qiao et al. .................... 524/495 |
| 7,232,606 | B2 | 6/2007 | Shao et al. |
| 7,258,896 | B2 | 8/2007 | Deckard et al. |
| 2002/0090501 | A1 * | 7/2002 | Tobita ......................... 428/297.4 |
| 2003/0096104 | A1 * | 5/2003 | Tobita et al. .................. 428/332 |
| 2004/0265755 | A1 * | 12/2004 | Park et al. ..................... 430/322 |
| 2005/0062024 | A1 | 3/2005 | Bessette et al. |
| 2005/0116336 | A1 * | 6/2005 | Chopra et al. ................ 257/720 |
| 2006/0035087 | A1 | 2/2006 | Yadav et al. |
| 2006/0062985 | A1 * | 3/2006 | Karandikar ................ 428/292.1 |
| 2006/0086043 | A1 | 4/2006 | Miller et al. |
| 2006/0166003 | A1 | 7/2006 | Khabashesku |
| 2007/0142548 | A1 | 6/2007 | Nejhad et al. |
| 2007/0155849 | A1 | 7/2007 | Miller et al. |
| 2007/0218272 | A1 | 9/2007 | Shao et al. |
| 2007/0265162 | A1 * | 11/2007 | Zhang et al. .................. 502/439 |
| 2008/0075954 | A1 * | 3/2008 | Wardle et al. ................. 428/339 |
| 2008/0220282 | A1 * | 9/2008 | Jang et al. .................... 428/689 |

FOREIGN PATENT DOCUMENTS

GB         619977         3/1949

OTHER PUBLICATIONS

European Search Report, EP09167000, Date of completion of search: Aug. 26, 2013.

* cited by examiner

*Primary Examiner* — Philip Tucker
*Assistant Examiner* — Vicki Wu
(74) *Attorney, Agent, or Firm* — Bracewell & Giuliani LLP

(57) ABSTRACT

A film adhesive for bonding adjacent composite structures.

7 Claims, 4 Drawing Sheets

110c

CARBON/CARBON FILM ADHESIVE

BACKGROUND

This disclosure relates to manufacturing composite structures.

DETAILED DESCRIPTION

Figure 1:
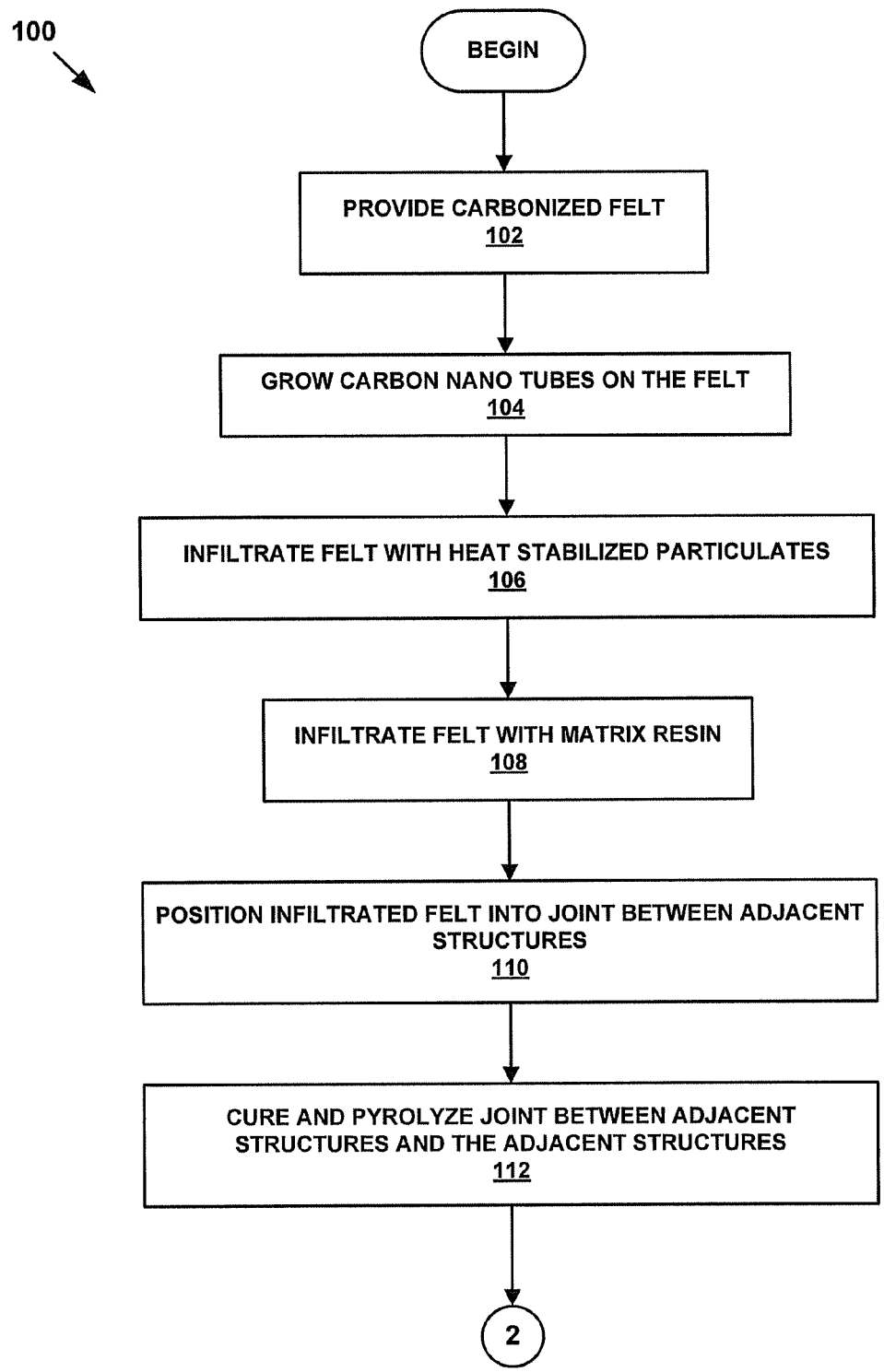
FIGS. 1 and 2 are a flow chart illustration of an exemplary embodiment of joining structures using an intermediate layer of material.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Ceramic composites, unlike polymeric composites, typically lack plastic deformation capability and may generate micro-crack defects during conventional processes such as, for example, pyrolysis. These micro-crack defects may result in stress concentrations which cannot be absorbed by plastic deformation, resulting in weak joints of the ceramic matrix bonded structures. In particular, condensation reaction resins, such as, for example, phenolics, have been used in carbon-carbon composites, producing poorly controlled void networks which typically degrade that strength of the joints in such structures. Little or poor control of the composition and microstructure of joint bond resins allows voids of uncontrolled size, shape and groupings to control the final inter-laminar bond strength in such composite structures.

Figure 2:
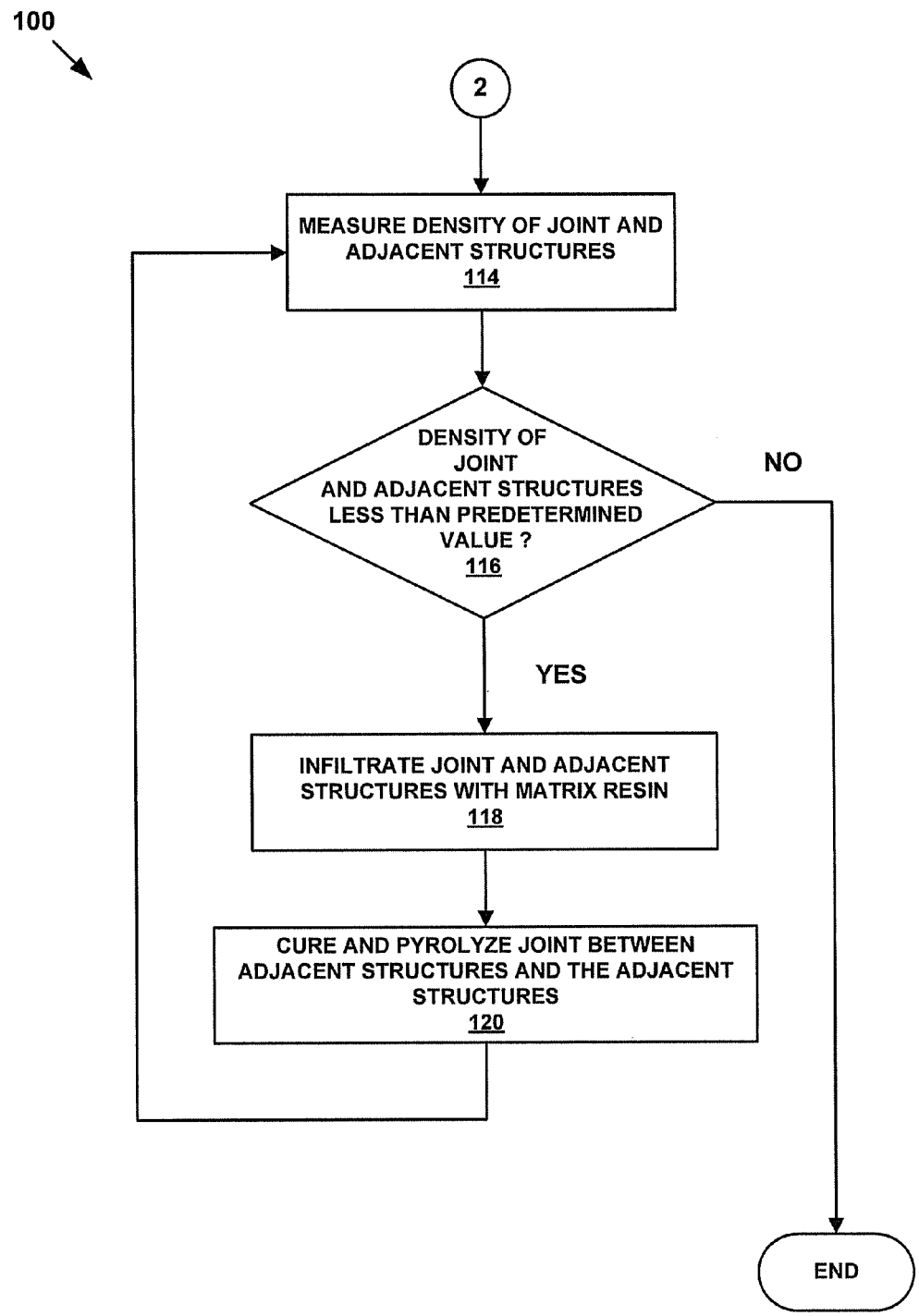
Figure 3:
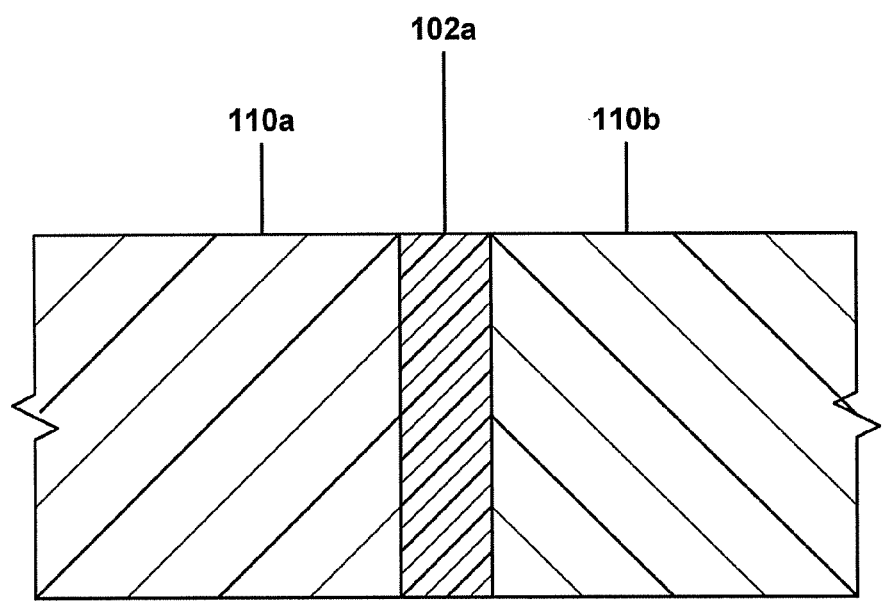
FIG. 3 is a fragmentary cross sectional of the placement of an intermediate layer of material between adjacent structures.

Referring to FIGS. 1-3, an exemplary embodiment of a method 100 of joining a composite structure includes providing a carbonized felt 102a in 102. In an exemplary embodiment, the carbonized felt 102a is a conventional carbonized felt having controlled orientations of fibers, porosity, and dimensional distributions that is commercially available, for example, from NEC/Morgan Advanced Materials.

Carbon nanotubes may then be grown on the fibers within the felt 102a in a conventional manner in 104. In an exemplary embodiment, in 104, the carbon nanotubes may be grown on the fibers within the felt 102a in a conventional manner transferring carbon from methane via chemical vapor deposition to a Fe/Mo catalyst embedded inside the porous medium of the felt which may be formed by conventional textile processes. The nanotube growth locations may be produced by infiltrating a solution containing the Fe/Mo catalyst into the porous medium of the felt 102a, coating the individual filaments, and condensing catalytic deposits on the surfaces of the filaments as the solute is removed. Carbon nanotubes may then be grown with a preferred orientation normal to the surfaces of the filaments of the felt 102a with the large, dispersed surface area, of the nanotubes stabilizing the curing resin to form small, dispersed shrinkage voids with greatly reduced stress concentration factors.

The felt 102a may then be infiltrated with heat stabilized particulates in 106. In an exemplary embodiment, the heat stabilized particulates may, for example, include carbon black, graphite, diamond or near-diamond particulates, single wall thickness carbon nanotubes, multi wall carbon nanotubes, graphene, carbonized phenolic micro-balloons, particulates with diamond coatings, and/or ground phenolic char. In an exemplary embodiment, in 106, higher density fillers such as, for example, diamond particulates may be used in order to build matrix density within the felt 102a. For example, diamond particulates undergo a crystal transformation to graphite at about 1500 degrees C. thereby adding solid volume to the porous microstructure of the felt 102a as the density of the particulate decreases from 3.5 to 2.2 g/cc. The extra volume provided by this process reduces or closes up matrix flaws such as, for example, microcracks and voids.

The felt 102a may then be infiltrated with a matrix resin in 108 to thereby form a film adhesive. In an exemplary embodiment, the matrix resin of either condensation or addition reaction mechanism, a precursor resin formulation to form a pyrolyzed carbon foam morphology produced by incorporating a low carbon yield, immiscible $2^{nd}$ phase, for example, poly butyral vinyl rubber (Butvar®), and/or a wetting agent. In an exemplary embodiment, the wetting agent may, for example, include Triton X100 which is commercially available from UCAR. In an exemplary embodiment, the addition of the wetting agent to the matrix resin in 108 may enhance impregnation of the matrix resin into the felt 102a thereby providing improved cohesion within the microstructure of the assembly 110c during subsequent processing steps in the method 100.

In an exemplary embodiment, after infiltrating the felt 102a with a matrix resin in 108, the method 100 provides a film adhesive having the following composition, by volume percentage: 5-35% carbonized felt; 0-15% carbon nanotubes grown on the fibers of the carbonized felt; 0-35% heat stabilized particulates; and 20-75% matrix resin.

In an exemplary embodiment, after infiltrating the felt 102a with a matrix resin in 108, the method 100 provides a film adhesive having, by volume, about 5-10% felt thereby allowing rough outer surfaces of the adjacent structures, 110a and 110b, to be bonded without the complete compaction of the felt between high spots in the outer surfaces of the adjacent structures that may support gaps between the opposing outer surfaces of the adjacent structures. The non-continuous, mobile, particulates in the film adhesive are thereby able to flow to the low spots in the opposing outer surfaces of the adjacent structures, 110a and 110b, with the liquid resin, thus filling any irregular bondline volume uniformly with filler material yielding uniform, superior properties in the resulting joint provided between the adjacent structures.

The film adhesive including the felt 102a may then be positioned between opposing surfaces of adjacent structures, 110a and 110b, to provide an assembly 110c in 110. In an exemplary embodiment, the adjacent structures, 110a and 110b, may be, for example, composite structures such as carbon/carbon composite structures that may be provided at any stage of manufacture, ranging from initial pre-preg, at an intermediate stage of curing, or at final curing. Furthermore, in an exemplary embodiment, the adjacent composite structures, 110a and 110b, may or may not be provided at the same stage of manufacture. In an exemplary embodiment, in 110, during the construction of the assembly 110c, portions of the film adhesive including the felt 102a may flow to fill in nonuniformities in the surfaces of the adjacent structures, 110a and 110b. In this manner, the thickness of the film adhesive including the felt 102a when positioned in the assembly 110c may be irregular and nonuniform.

The assembly 110c may then be cured, for example, in an oven or autoclave and then pyrolyzed in a furnace in 112. The density of the pyrolyzed assembly 110c may then be determined in 114.

If the density of the pyrolyzed assembly 110c is less than a predetermined value in 116, then the pyrolyzed assembly 110c is infiltrated with a matrix resin in 118. The assembly 110c may then be cured and pyrolyzed again in 120. After curing and pyrolyzing the assembly 110c again in 120, the density of the pyrolyzed assembly 110c may then be determined again in 114, and if the density of the pyrolyzed assembly 110c is still less than a predetermined value in 116, then the steps of 118, 120, 114, and 116 are repeated again. Thus, the steps 114, 116, 118, and 120 of the method 100 are repeated until the density of the assembly 110c achieves a desired predetermined value.

If the density of the pyrolyzed assembly 110c is greater than or equal to a predetermined value in 116, then the processing of the assembly 110c is completed.

Figure 4:
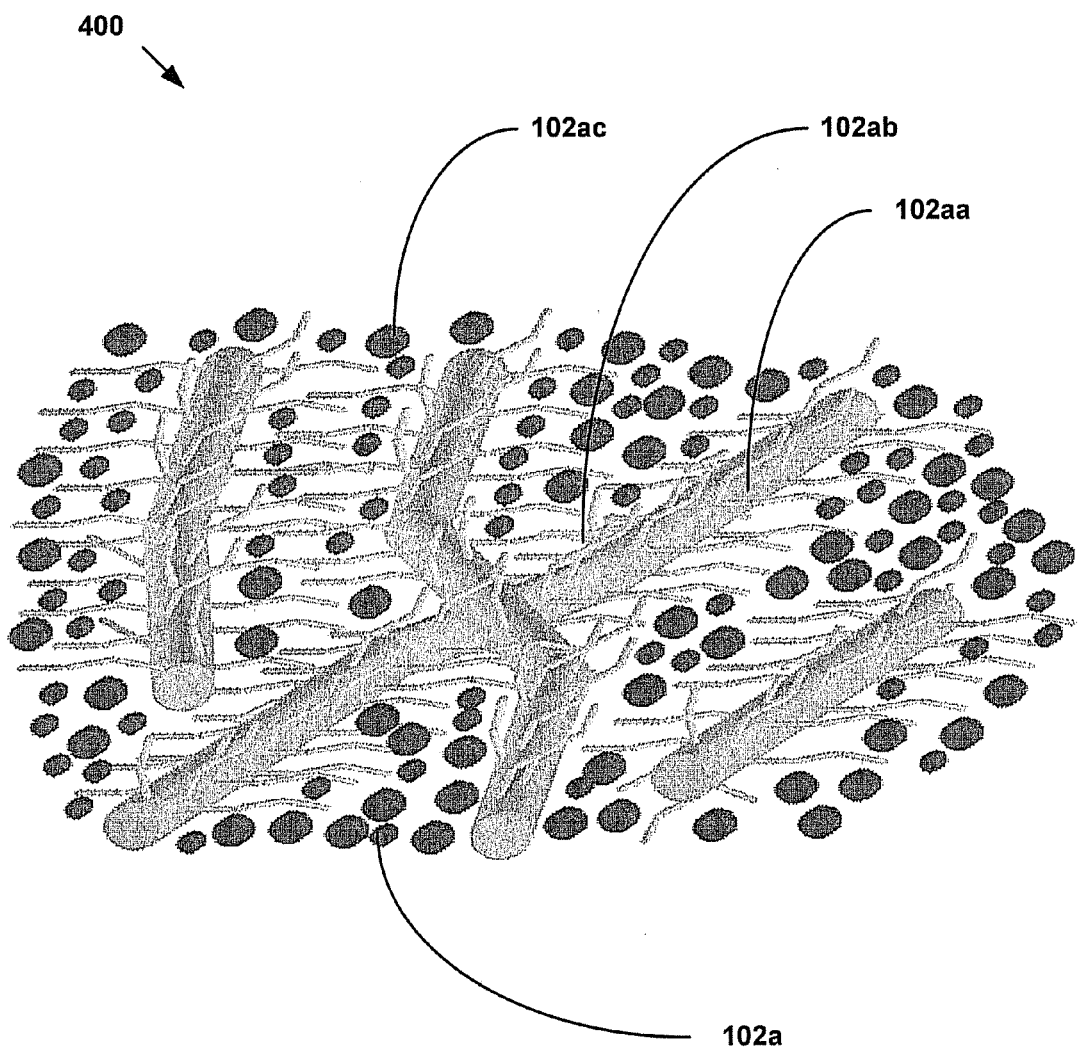
FIG. 4 is an illustration of an exemplary embodiment of the microstructure of the intermediate layer of material.

In an exemplary embodiment, as illustrated in FIG. 4, the microstructure of a film adhesive 400, including the felt 102a, provided by the method 100 includes carbon felt filaments 102aa, carbon nano-tubes 102ab that are grown on the carbon felt filaments, and solid particulates 102ac of various sizes.

In an exemplary embodiment, the carbonized felt 102a of the method 100 is selected to provide control of the porosity and load paths in the felt and may include fibers that are oriented in 2 directions. In an exemplary embodiment, the carbonized felt 102a of the method 100 may also include staple fiber that may, for example, be crimped or oriented, as in needlefelted, in order to provide more control of the felt filament bundle size and pore structure. In an exemplary embodiment, the volume fraction of the fibers of the carbonized felt 102a of the method 100 ranges from about 5 to 35 percent. In an exemplary embodiment, the thickness of the carbonized felt 102a of the method 100 may be up to about 0.005 to 0.015 inches.

In an exemplary embodiment, the carbon nanomaterials provided in the felt 102a of the method 100 in steps 104 and 106 are selected to reduce void formation and the overall tendency of the matrix resin to shrink and potentially form large voids during subsequent curing and pyrolysis of the assembly 110c and may include, for example, one or more of the following: a) single wall carbon nanotubes, b) multi-wall carbon nanotubes, and/or c) graphene platelets. In an exemplary embodiment, the carbon nanotubes are provided by growing the carbon nanotubes on the fibers of the carbonized felt 102a of the method 100 in 104 that may, for example, be off-axis carbon nanotubes. In an exemplary embodiment, the carbon nanotubes are provided by growing forests of carbon nanotubes on the fibers of the carbonized felt 102a of the method 100 in 104. In an exemplary embodiment, the carbon nanotubes are provided by growing patchy forests of carbon nanotubes on the fibers of the carbonized felt 102a of the method 100 in 104. In an exemplary embodiment, if the carbon nanotubes are provided by growing forests of carbon nanotubes on the fibers of the carbonized felt 102a of the method 100 in 104, then, prior to infiltrating the felt with a matrix resin in 108, some of the forest of carbon nanotubes may be burned or abraded off to provide the matrix resin better access to the fibers of the felt during the subsequent infiltrating of the felt with the matrix resin. In an exemplary embodiment, the carbon nanotubes grown on the fibers of the carbonized felt 102a of the method 100 in 104 have length to diameter ratio of at least about 100.

In an exemplary embodiment, nano-material filler formulations may be added as dry mixtures to the felt 102a, including single wall nanotubes, multiwall nanotubes, graphene platelets, carbon blacks, nano-sized resin char, graphite and diamond. In an exemplary embodiment, nano-material filler formulations may be added as a wet mixture in the resin to the felt 102a, including single wall nanotubes, multiwall nanotubes, graphene platelets, carbon blacks, nanosized resin char, graphite and diamond.

In an exemplary embodiment, after infiltrating the felt 102a with a matrix resin in 108, the method 100 provides a felt having the following composition, by volume percentage: 10% carbonized felt; 10% multi wall carbon nanotubes grown on the fibers of the carbonized felt; 30% carbon black heat stabilized particulates; and 50% SC-1008 matrix resin that includes 1-2% Triton X-100 wetting agent. In an exemplary embodiment, the carbonized felt includes fibers oriented in the X, Y, and Z directions in the following percentages: 40% X, 40% Y, and 20% Z. In an exemplary embodiment, the carbon black heat stabilized agglomerates are reduced to 0.03 to 1.0 micron particulates by mechanical or viscous shear forces.

In an exemplary embodiment, other materials may be substituted for, or used in addition to the carbonized felt 102a in the method 100 such as, for example, porous paper. In an exemplary embodiment, when a porous paper is substituted for the carbonized felt 102a in the method 100, the method provides a felt having the following composition, by volume percentage: up to 5% porous paper; 5-10% carbon nanotubes grown on the fibers of the porous paper; 30-40% heat stabilized particulates; 45-60% matrix resin; and wetting agent 0.5-2%.

In an exemplary embodiment, one or both of the adjacent structures, 110a and 110b, may be other types of structures that are compatible with the composition of the film adhesive including the felt 102a and processing steps of the method 100 such as, for example, ceramic composite structures.

In an exemplary embodiment, the heat stabilized particulates of the method 100 are selected to reduce the overall tendency of the film adhesive including the felt 102a to shrink during subsequent pyrolysis and heat treatment of the assembly 110c and may include, for example, one or more of the following: a) heat stabilized carbon and/or graphite particulates; b) near-diamond carbon or diamond carbon particulates that lose their meta-stability at about 800-1500 degrees C. thereby changing to a lower density carbon state to fill pyrolysis weight loss induced space in the layer; d) carbon black; and/or e) single or multi wall carbon nano tubes; graphene; carbonized phenolic micro-balloons, and ground phenolic char.

In an exemplary embodiment, the resin mixture of the method 100 is selected to provide a high char yield during subsequent pyrolysis and heat treatment of the assembly 110c and may, for example, include one or more of the following: a) phenolic resin, b) naphthalene resin, c) high char yield resins of either condensation or addition reaction mechanism, a precursor resin formulation to form a pyrolyzed carbon foam morphology produced by incorporating a low carbon yield, immiscible $2^{nd}$ phase, for example, poly butyral vinyl rubber (Butvar®); and d) a wetting agent. In an exemplary embodiment, the wetting agent of the method 100 is selected to control the microstructure or the fillers and improve cohesion in the resulting adhesive film including the felt 102a.

In an exemplary embodiment, the diameter of the fibers within the felt 102a are selected such that diameters of the fibers are less than or equal to $\frac{1}{4}^{th}$ of the spacing between the opposing faces of the adjacent structures, 110a and 110b, in the assembly 110c, prior to curing the joint in 112. In this manner, the non-uniform random stacking of the filaments of the felt 102a have a reduced tendency to form columns preventing closure of the opposing surfaces of the adjacent structures, 110a and 110b, to nominal bondline thickness and supporting the clamping pressure within the joint. As a result, the pressure created during the curing in 112 may be reduced on the resin formulation within the felt 102a and may allow volatiles to form uncontrolled voids within the joint.

In an exemplary embodiment, the single or multi-wall carbon nanotubes used in the felt 102a may only be a few nanometers in diameter and may have lengths ranging from about 100 nm to 2000 nm in order to provide a stabilizing contact area between the carbon nanotubes and the matrix resin used in the felt 102a and reduce the tendency of the carbon nano-tubes from becoming entangled which may prevent flow of the matrix resin and fully filling the irregularities in the joint between the adjacent structures, 110a and 110b. In an exemplary embodiment, the nanotubes cover about 0.5 to 10% of the felt 102a. In an exemplary embodiment, the impregnation of the felt 102a with matrix resin in 108 may be modified by empirically determining the effect of the nanotube size, shape and distribution upon the matrix resin impregnation method. In an exemplary embodiment, microfibers, such as, for example, APSCI's Pyrograf III, may also be used with an open, low density, felt material which have sufficiently large pore structure to allow full impregnation of the larger fibers of a felt.

In an exemplary embodiment, the size distributions of the particulate fillers used in the film adhesive including the felt 102a are selected such that the fillers only constitute a small fraction of the nominal pore size of the felt material to ensure free flow of the felt to fill irregularities in the joint between the adjacent structures, 110a and 110b.

In an exemplary embodiment, one or more particulate size distributions may be used in the film adhesive including the felt 102a in order to produce the greatest final density of particulates that still permits the felt material to ensure free flow of the felt to fill irregularities in the joint between the adjacent structures, 110a and 110b.

In an exemplary embodiment, the film adhesive including the felt 102a provided by the method 100 may include the ability to develop sufficient permeability at low pyrolysis temperatures in 112 in order to allow the pyrolysis reaction off-gassing to vent out of the composite assembly 110c before the internal pressure delaminates the composite assembly.

In an exemplary embodiment, sufficient permeability is developed at low pyrolysis temperatures in 112 in order to allow the pyrolysis reaction off-gassing to vent out of the composite assembly 110c before the internal pressure delaminates the composite assembly may be provided by felt 102 by including hollow or porous spun fibers in the felt that are more than 75% solid and in staple form in order maintain final density and provide entrance/exit points for the off-gassing. In an exemplary embodiment, such fibers may include highly oriented pitch fibers, having very highly oriented mesophase pitch fibers, that tend to crack radially with heat treatment and such fine cracks are difficult to seal with matrix resins.

In an exemplary embodiment, sufficient permeability at low pyrolysis temperatures in 112 in order to allow the pyrolysis reaction off-gassing to vent out of the composite assembly 110c before the internal pressure delaminates the composite assembly may be provided by felt 102 by including vapor grown fibers in the felt that are naturally hollow. In an exemplary embodiment, larger catalytic initiation deposits will typically create larger fibers and hollow cores to reduce the pressure gradient of off-gassing during 112. In an exemplary embodiment, mechanical stress may be required to break the fibers free of the foundation fibers to expose these viaducts.

In an exemplary embodiment, sufficient permeability at low pyrolysis temperatures in 112 in order to allow the pyrolysis reaction off-gassing to vent out of the composite assembly 110c before the internal pressure delaminates the composite assembly may be provided by felt 102 by including highly textured particulate materials in the felt. Such highly textured particulate materials may, for example, include graphite, low density carbon agglomerates, or rapidly degrading organics that may maximize the development of such porosity. In an exemplary embodiment, materials such as fibrillated aramid fibers or cotton fibers that are hydrophilic to transport reaction moisture and, after cure, begin decomposition at similar or lower temperatures than the high char yield pre-cursor polymers may be used in the film adhesive including the felt 102a for joining carbon-carbon composites.

In an exemplary embodiment, the film adhesive including the felt 102a may include combinations of one or more of hollow spun fibers, highly oriented pitch fibers, vapor grown fibers, and/or highly textured particulate materials in order to provide a film adhesive for joining the adjacent structures, 110a and 110b, using the method 100 that handles well, applies uniformly, flows as needed to fill irregularities in the bonding surfaces of the assembly 110c, stabilizes the matix resin during cure in 112 to control voids in the joint, initiates porosity development to reduce the detrimental effects of high internal pressure that may be developed during pyrolysis and, finally, provides a solid skeleton of stable, fully carbonized materials to minimize shrinkage and interlaminar stress in the resulting assembly and build strong inter-laminar bonds as densification continues.

In an exemplary embodiment, after infiltrating the felt 102a with a matrix resin in 108, the method 100 provides a felt having the following composition, by volume percentage: 25-60% fibers and fillers and 40-75% liquid resin formulation. In an exemplary embodiment, the integrated formulation of the multi-component film adhesive provided by the felt 102a of the method 100 provides a displacable material system which may fully fill irregularities present in the opposing surfaces of the adjacent structures, 110a and 110b, to be joined while retaining the high loading of dispersed particulate and other filler material within the felt which may control the formation of condensation reaction by-product voids and reinforce the matrix resin during pyrolysis in 112. In an exemplary embodiment, the solid volume fraction of the film adhesive including the felt 102a contains, by volume percentage, 20-60% fiber, of which, at least 5% of the fiber is long fiber, greater than ½ inch in length, in order to aide handling of the felt. In an exemplary embodiment, the remaining solids in the film adhesive including the felt 102a are particulate fillers of sufficiently small size to flow through the felt in order to fill irregularities in the opposing surfaces of the adjacent structures, 110a and 110b, joined by the method 100.

In an exemplary embodiment, long fibers, CVD nanotubes, and particulate fillers ratios affect adhesive flow and their loadings may be adjusted to match the application and process forces available and compatible with the material. In an exemplary embodiment, solid concentrations within the felt 102a, by weight percentage, ranges from, 5 to 35% carbonized felt; 0-15% carbon nanotubes grown on the fibers of the carbonized felt; and 10-35% heat stabilized particulates.

In an exemplary embodiment, the microstructure of the carbonized film adhesive including the felt 102a includes microcracks and porosity thereby permitting pyrolysis off-gassing to escape the composite assembly 110c without de-bonding the joint between the adjacent structures, 110a and 110b. In an exemplary embodiment, a small consistent contiguous pore structure is provided in the carbonized film adhesive including the felt 102a thereby yielding a bondline between the adjacent structures, 110a and 110b, that has good first cycle bond strength and provides ready access for the re-impregnation process 118 in the method 100, to fully densify and further enhance the bond.

It is understood that variations may be made in the above without departing from the scope of the invention. For example, the teachings of the present exemplary embodiments may be applied to the manufacture of any type of composite assembly subjected to weight loss, off-gassing, or significant resin shrinkage. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A method of manufacturing a composite assembly comprising a first carbon composite structure, a second carbon composite structure, and a carbonized fiber adhesive film located therebetween to connect adjacent surfaces thereof, the method comprising:
    providing a film material comprising carbon fibers;
    growing carbon nanotubes on the fibers of the film material;
    infiltrating the film material with heat stabilized nano-material filler particulates selected from the group consisting of: carbon black, graphite particulates, graphene, carbonized phenolic micro-balloons, meta-stable high density carbon particulates, near-diamond coatings, and ground phenolic char;
    after growing the carbon nanotubes on the fibers, infiltrating the film material with a matrix resin to provide the adhesive film, the matrix resin being selected from the group consisting of a phenolic resin, a napthelene resin, a high char yielding resin of either condensation or addition reaction mechanism, resin formulations which produce foam microstructures by pyrolysis of low char yield discontinuous phases, and poly butyral vinyl rubber;
    positioning the adhesive film between and in contact with the first and second carbon composite structures to provide the composite assembly, the positioning causing the particulates to flow into any non uniformities in opposing outer surfaces of the structures; and
    heating the composite assembly to cure the composite assembly.

2. The method of claim 1, wherein the film material is selected from the group consisting of a carbonized felt and a porous paper.

3. The method of claim 1, wherein the matrix resin further comprises a wetting agent.

4. The method of claim 1, wherein, after the film material is infiltrated with a matrix resin, the following composition, by volume percentage, is provided: 5-35% film material; 0-10% carbon nanotubes grown on the fibers of the film material; 0-35% heat stabilized particulates; and 20-75% matrix resin.

5. The method of claim 1, further comprising:
    measuring the density of the cured composite assembly; and
    if the density of the cured composite assembly is less than a predetermined value then infiltrating the cured composite assembly with additional matrix resin and heating the cured composite assembly to cure the additional matrix resin in the cured composite assembly.

6. The method of claim 1, wherein heating the composite assembly comprises heating the composite assembly in an oven followed by pyrolyzing the composite assembly in a furnace.

7. The method of claim 1, wherein growing carbon nanotubes on the fibers of the film material occurs before infiltrating the film material with the heat stabilized nano-material filler particulates.

* * * * *